Figure 1:
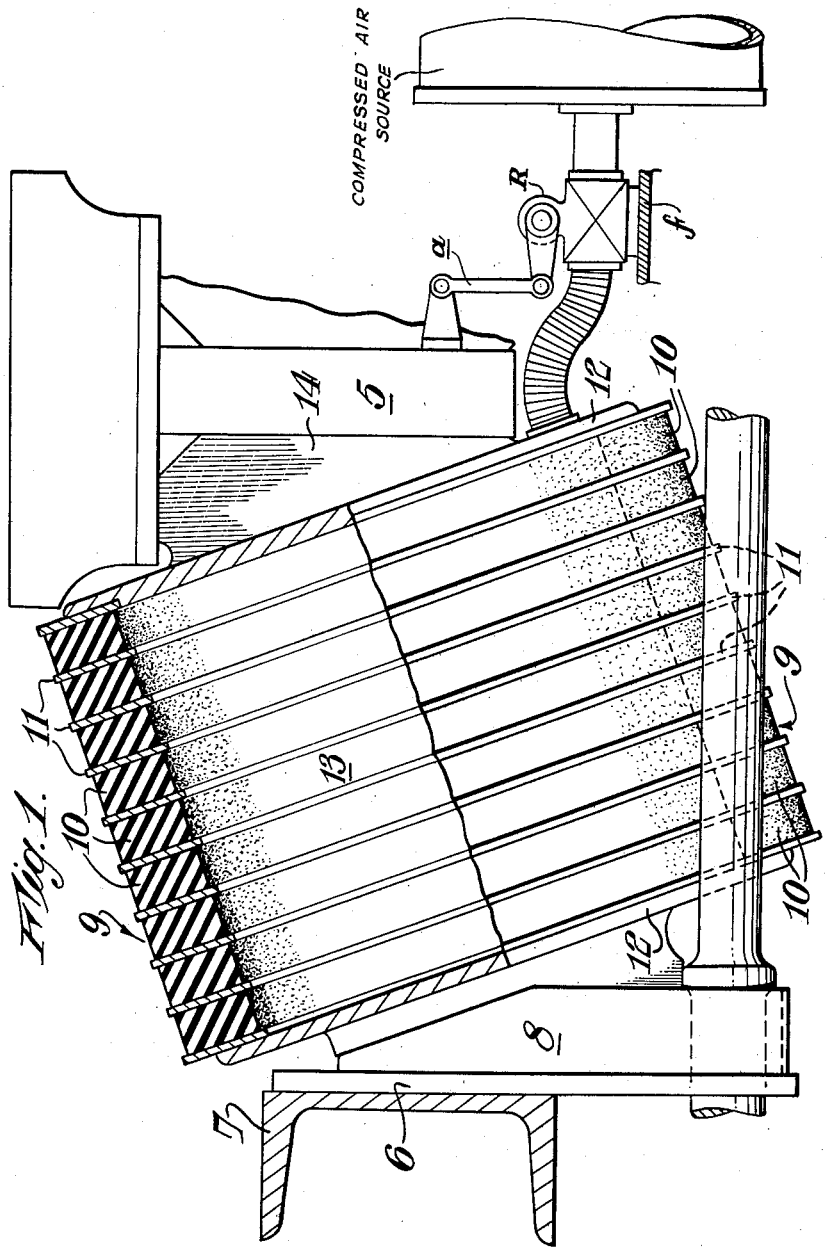

Feb. 13, 1962 A. J. HIRST 3,020,856
VEHICLE SUSPENSION SYSTEM
Filed Oct. 2, 1958 4 Sheets-Sheet 1

Inventor
Archie J. Hirst
By Ralph B. Stewart
Attorney

Feb. 13, 1962 A. J. HIRST 3,020,856
VEHICLE SUSPENSION SYSTEM
Filed Oct. 2, 1958 4 Sheets-Sheet 2

Inventor
Archie J. Hirst
By Ralph B. Stewart
Attorney

Feb. 13, 1962  A. J. HIRST  3,020,856
VEHICLE SUSPENSION SYSTEM
Filed Oct. 2, 1958  4 Sheets-Sheet 3

Inventor
Archie J. Hirst
By Ralph B. Stewart
Attorney

United States Patent Office 3,020,856
Patented Feb. 13, 1962

3,020,856
VEHICLE SUSPENSION SYSTEM
Archie John Hirst, Leicester, England, assignor to Metalastik Limited, Leicester, England, a British company
Filed Oct. 2, 1958, Ser. No. 764,877
Claims priority, application Great Britain Oct. 3, 1957
7 Claims. (Cl. 105—197)

This invention concerns vehicle suspensions, more particularly for railway vehicles. The object of the invention is to provide a suspension comprising hollow spring blocks of rubber-like material in which the springing provided by the blocks is supplemented at least under certain conditions by gas pressure within the hollow interiors of the spring blocks whereby a combined rubber and pneumatic suspension is obtained without necessarily resorting to separate rubber and pneumatic spring means.

Certain disadvantages attach to a pneumatic suspension for railway vehicles in which the body of the vehicle is suspended solely by pneumatic means. One of these disadvantages is that the volume of the air is excessive. Another disadvantage is that if the existing compressed air system provided for brake actuation is used in the pneumatic suspension there is no spring support for the vehicle when the compressed air system is inoperative.

These disadvantages are reduced or overcome by the present invention, the first because the pneumatic springing contributes only in part to the suspension so that the volume of air required is smaller, and the second because the rubber springing provides spring support when the pneumatic springing is inoperative.

Another object of the invention is to provide a suspension in which the pneumatic springing is used to limit the vertical deflection of the body of the vehicle under increasing load conditions and more particularly maintain the body at a predetermined height with variations in load; the rubber springing alone supporting the vehicle body at the predetermined height under tare load conditions. This is of particular importance in railway vehicles (e.g. for suburban passenger traffic) where the load of the passengers varies greatly and can be relatively large compared with the tare load. By maintaining a substantially predetermined height under different loading conditions it is possible to provide adequate rubber springing without excessive deflection over the full load range, and when the vehicle is empty the vehicle may be shunted with the body at the required height even although the pneumatic springing be inoperative because the compressed air system is decoupled.

Another object of the invention is to provide a combined rubber and pneumatic suspension in which rubber spring blocks acting in combined shear and compression to take the vertical load are employed.

Another object of the invention is to provide an improved combined rubber and pneumatic suspension for the bolster of a railway vehicle bogie.

A still further object is to provide, according to a particular embodiment of the invention a bolster suspension located entirely to one side of the bolster.

These and other objects of the present invention will now be further described and explained with reference to the accompanying drawings which show, by way of example only, practical applications of the present invention.

Figure 2:
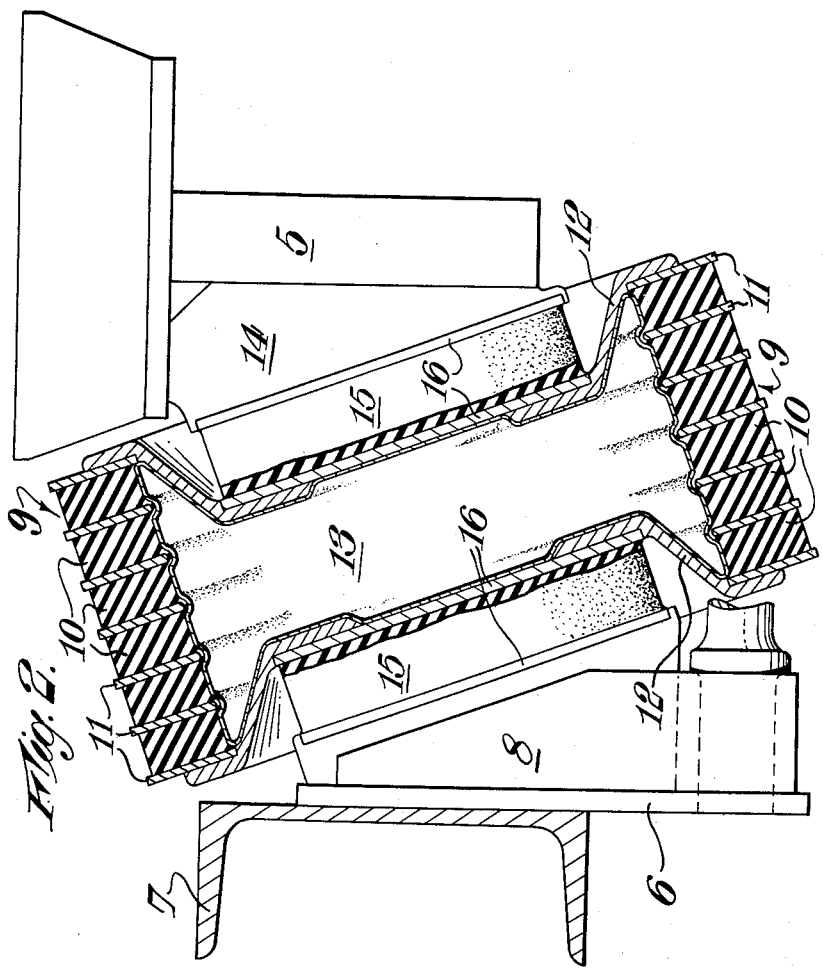
Figure 3:
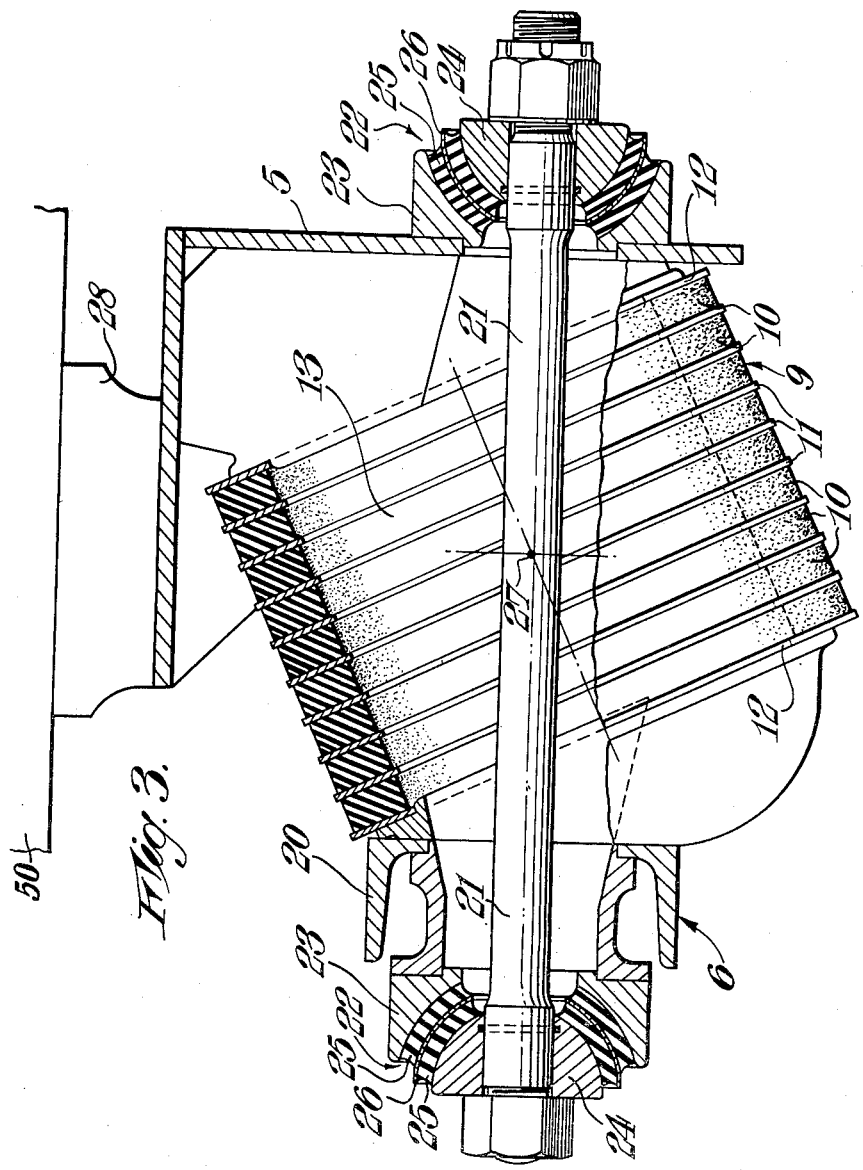
Figure 4:
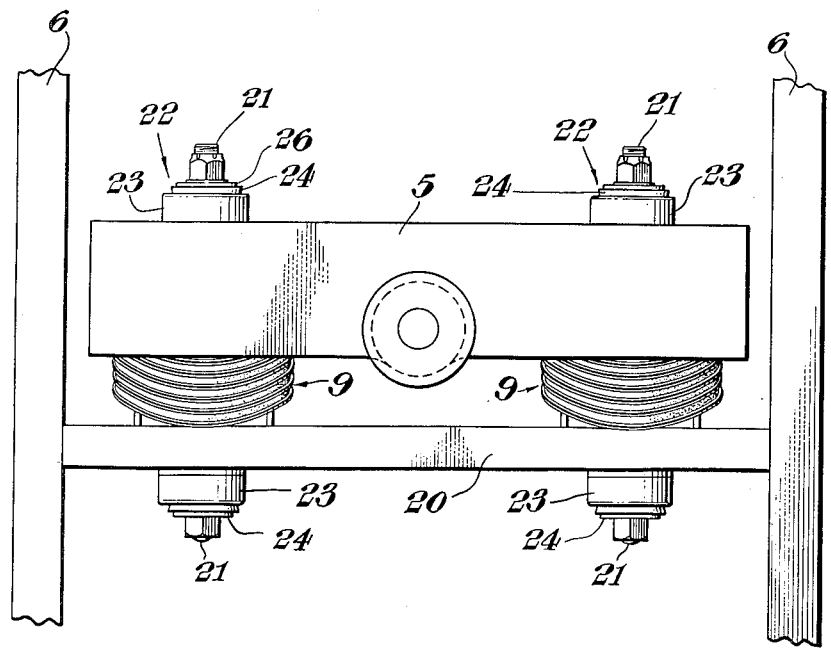

In the drawings:

FIG. 1 is a side elevation, partly in section, of a hollow spring block of rubber-like material which forms a part of a combined rubber and pneumatic suspension for a bolster of a railway vehicle, FIG. 2 is a similar view showing an alternative construction, FIG. 3 is a view similar to FIG. 1 showing yet a further construction, and FIG. 4 is a diagrammatic plan view of the construction shown in FIG. 3.

Referring to FIG. 1: the bolster 5 is supported from the frame 6 and the bolster in turn supports the body of the vehicle in any known or convenient manner.

The bolster extends parallel to, and between, a pair of transoms of which only one is indicated at 7. Between a wedge member 8 carried by the transom 7 and a corresponding member 14 carried by the bolster 5 there is provided a hollow body or spring block of rubber-like material, which is generally indicated by the reference numeral 9. A pair of blocks 9 are arranged opposite each other at each end of the bolster so that the bolster is supported by four bodies as described.

The block 9 comprises a plurality of rings of rubber-like material 10, a plurality of metal interleaves 11 between each pair of rings, the rings and the interleaves being bonded together. The rings 11 at the end of the assembly so produced are secured to end plates 12. The lower end plate 12 engages in any suitable manner with the wedge 8 while the upper plate 12 similarly engages with the member 14.

The plates 12 close the ends of the hollow block 9 so that there is formed a sealed air space 13 within hollow block 9.

The space 13 is connected with a source of supply of compressed air and valve means R is provided for regulating the supply of compressed air to the space 13 and the escape of air therefrom. It is preferred that the bolster 5, is operatively connected to actuate one element of the regulating valve means R, as diagrammatically illustrated at a, the other element of the valve means being carried by the frame as diagrammatically illustrated at f so that with variation in loading (and consequent adjustment in the height of the bolster 5) the valve means is operated to permit compressed air to be supplied to the air space 13 or to escape therefrom. The result is that the bolster 5, and hence the body of the vehicle, is maintained at a predetermined datum height relatively to the vehicle frame.

Referring now to FIG. 2: the suspension is generally as described with reference to FIG. 1 and like parts carry like reference numerals. In the arrangement of FIG. 2 there is provided, between each end plate 12 and the wedges 8 and 14, a spring 15 of rubber-like material in the form of a solid block or slab. The block or slab is sandwiched between plates 16 (to which the block or slab is bonded) and one of the plates 16 of each block enters a recess in the end plate 12 while the other enters a corresponding recess in the wedge 8 or 14. It is preferred that the spring 15 and plate 16 be circular to enter a circular recess in end plates 12 and wedges 8, 14.

An air space 13 is formed within the hollow body 9 and compressed air is supplied to the space 13 in the manner, and for the purpose, referred to above.

With each of the arrangements referred to the hollow block 9 constitutes a spring of rubber-like material which is inclined to the vertical so as to act (under the vertical loading applied to the bolster 5) in combined shear and compression. The air within the space 13 assists in supporting the load and by varying the pressure within the space 13 the height of the body can be maintained at a predetermined datum. Consequently the spring 9 can be designed for a specified deflection and over a wide range of loading will operate within the designed limits of deflection. Thus, the deflection permitted to the spring 9 can be less than that which would take place upon variation in load from tare to maximum since deflections beyond a specified amount can be rectified or nullified by varying the pressure of the pneumatic suspension.

With the arrangement of FIG. 1 it may be found that the volume of the air space 13 is such that the periodicity is considerably lower at maximum loading than at tare loading. To reduce or eliminate this tendency the arrangement of FIG. 2 is provided in which a proportion only (e.g. two-thirds) of the tare deflection is provided for by the body 9 and the remainder is provided by the springs 15 acting in combined shear and compression, the air space 13 being so selected as to ensure that unnecessary variation in the periodicity with maximum load is avoided.

In the arrangement of FIG. 2 the variation in height of the body wil be accounted for in part by variation in the thickness (axial length) of the springs 15 and this will be accounted for when the valve means R is adjusted by variations in height between the body and the frame.

When the frame 6 is supported on the wheels by axle box springs variations in the height of the vehicle body will be accounted for, in part by the axle box springing. To take account of this the valve means R may be controlled by relative variation in distance between the vehicle body and the ground (as represented, for instance, by the axle) instead of between the bolster (or body) and the frame 6. In this case the valve means R would be supported from the axle.

While the longitudinal stiffness of the bolster springing described is less than similar installations incorporating solid (i.e. not hollow) rubber spring bodies nevertheless the longitudinal stiffness provided in a suspension according to this invention may be adequate without providing a means (additional to the spring bodies) to resist the longitudinal loading.

In bolster suspension as hitherto provided which incorporated solid rubber spring bodies the shear stiffness tends to decrease with increase in load. The shear stiffness depend upon the extent to which the body is compressed. With hollow spring bodies wherein the air supply is variable the compression on the body is substantially constant and consequently the variation in shear stiffness referred to is reduced or eliminated. Indeed it may be arranged by control of the pneumatic pressure to vary the shear stiffness as desired—e.g. it could be increased as the load increases.

In the construction of FIGS. 3 and 4 the bolster 5 (as in the arrangements of FIGS. 1 and 2) is supported from frame 6 by a spring block 9 which is hollow and comprises a plurality of rings 10 of rubber-like material, metal interleaves 11 and end plates 12 all as described above. However, instead of arranging pairs of the bodies 9 at each end of the bolster one body only is provided, towards each end of the bolster, between the bolster 5 and the transom 20 of frame 6 and in combination therewith, there is a relatively short horizontal link 21 which passes longitudinally of the vehicle, through each of the hollow blocks 9. Each link is anchored, at one end, to the transom 20 and, at the other end, to the bolster 5. Each anchorage, which is generally indicated at 22, comprises a part-spherical socket 23, a part-spherical head 24 secured to link 21 and a rubber interlayer 25 incorporating a metal interleaf 26. The spherical anchorages or pivot joints 22 permit movement of the links 21 horizontally and/or vertically with movement of the bolster 5 relatively to transom 20.

The rubber interlayers 25 act as seals for the space 13 within hollow block 9 and prevent escape of air under pressure from the block. The air is supplied to the hollow interior of the blocks 9 as above described.

The blocks 9 are held in a state of pre-compression by the links 21; the links consequently being in tension.

The vertical load of the bolster 5 is supported by the blocks 9 acting in combined shear and compression and also by the pressure of the air in spaces 13, assuming that the links 21 are horizontal. If the links 21 are displaced sideways by the vertical loading the latter is also supported in part by the vertical component of the tension force of the links.

Transverse loads on the vehicle are resisted by the blocks 9 in shear and by the horizontal component of the tension force of the links 21. The pre-compression of blocks 9 may be such that the blocks have negative stiffness whereby the transverse restoring force becomes less as the load increases. The longitudinal stiffness of the links 21 is that of the part-spherical anchorages 22. The transverse controlling force is thus selectable to be relatively small so that transverse movement is little impeded.

While the links 21 are shown as passing through the blocks 9 so that the axis of each link coincides with the centre of its spring (at 27) the link may be to one side of the centre 27.

Each link 25 may be replaced by a pair of parallel rods connected to a cross head which carries the head 24 between the rods.

The block 50 of the vehicle rests upon side bearers in known manner of which one bearer 28 is shown in FIG. 3. The centre of loading of the bearer 28 also passes through centre 27. The static weight is then symmetrical about centre 27.

As the vertical load increases (and consequently the pressure of air in the blocks 9 is increased) the horizontal tension force in links 21 increases, because of the rise in air pressure, and in this way the advantage is secured over the first two constructions that the transverse controlling force increases with vertical load.

The provision of the blocks 9 at one side only of the bolster 5 results in a suspension which occupies less longitudinal space so that more space is available for other purposes e.g. for traction motors. Also only one transom is required.

The initial adjustment in level of the bolster can readily be performed by tightening or loosening the nuts 28 of links 21.

With any of the constructions described the blocks 9 may be inclined inwardly towards the centre of the bolster as well as being upwardly directed as shown.

While it is preferred that the anchorages 22 incorporate rubber interlayers this is not necessary and metallic or non-metallic bearing surfaces on parts 23, 24 may be employed.

The present invention provides in each embodiment described a spring suspension having the advantages both of a pneumatic suspension and of rubber springing, more especially the elimination of metal-to-metal sliding surfaces and the consequent need for maintenance at frequent intervals and also the low value of the transverse restoring force since the spring blocks 9 act at least mainly in shear when subjected to these transverse forces.

I claim:

1. In a vehicle a suspension supporting a suspended part of the vehicle from a supporting part thereof, the suspension comprising a hollow spring block defined by a plurality of rings of rubber-like material having interleaves affixed therebetween, said block being inclined to the vertical so as to be in combined shear and compression under the vertical load of the suspended part, the hollow interior of said spring block constituting at least part of a gas tight space, regulating means for supplying gas under pressure into said space and for allowing its escape therefrom, thereby to regulate the pressure of gas in said space, and actuating means responsive to changes in load of the suspended part of the vehicle, said actuating means being operatively connected to actuate said regulating means to regulate the pressure of gas in said space thereby predeterminedly to limit the vertical deflection of the spring block under the load of the suspended part of the vehicle regardless of the load of the suspended part.

2. In a vehicle a suspension supporting a suspended part of the vehicle from a supporting part thereof, the suspension comprising a hollow spring block defined by a plurality of rings of rubber-like material having interleaves affixed therebetween, said block being inclined to the vertical so as to be in combined shear and compression under the vertical load of the suspended part, the hollow interior of said spring block constituting at least part of a gas tight space, regulating means for supplying gas under pressure into said space and for allowing its escape therefrom, thereby to regulate the pressure of gas in said space, and actuating means responsive to changes in level of the suspended part of the vehicle relative to a reference level due to changes in the load of the suspended part, said actuating means being operatively connected to actuate said regulating means to regulate the pressure of gas in said space thereby to maintain the suspended part at said reference level regardless of the load of the suspended part.

3. In a vehicle a suspension supporting a suspended part of the vehicle from a supporting part thereof, the suspension comprising a hollow spring block defined by a plurality of rings of rubber-like material having interleaves affixed therebetween, a solid spring block of rubber-like material in series arrangement with said hollow spring block and located at one end thereof, said hollow spring block and said solid spring block being correspondingly inclined to the vertical so as to be in combined shear and compression under the vertical load of the suspended part, the hollow interior of said spring block constituting at least part of a gas tight space, regulating means for supplying gas under pressure into said space and for allowing its escape therefrom, thereby to regulate the pressure of gas in said space, and actuating means responsive to changes in load of the suspended part of the vehicle, said actuating means being operatively connected to actuate said regulating means to regulate the pressure of gas in said space thereby predeterminedly to limit the vertical deflection of the spring block under the load of the suspended part of the vehicle regardless of the load of the suspended part.

4. In a vehicle a suspension supporting a suspended part of the vehicle from a supporting part thereof, the suspension comprising a hollow spring block defined by a plurality of rings of rubber-like material having interleaves affixed therebetween, a pair of solid spring blocks of rubber-like material in series arrangement with said hollow spring block and located one at each end of the hollow spring block, said hollow spring block and said solid spring blocks being correspondingly inclined to the vertical so as to be in combined shear and compression under the vertical load of the suspended part, the hollow interior of said spring block constituting at least part of a gas tight space, regulating means for supplying gas under pressure into said space and for allowing its escape therefrom, thereby to regulate the pressure of gas in said space, and actuating means responsive to changes in load of the suspended part of the vehicle, said actuating means being operatively connected to actuate said regulating means to regulate the pressure of gas in said space thereby predeterminedly to limit the vertical deflection of the spring block under the load of the suspended part of the vehicle regardless of the load of the suspended part.

5. In a railway vehicle including a body, a frame and a bolster supporting the vehicle body on the frame, a suspension supporting the bolster from the frame, the suspension comprising a pair of hollow spring blocks defined by a plurality of rings of rubber-like material having interleaves affixed therebetween arranged to one side of the bolster one towards each end of the bolster, said hollow spring blocks being inclined to the vertical so as to be in combined shear and compression under the vertical load of the body and the bolster, the hollow interior of each of said spring blocks constituting at least part of a gas tight space, a pair of substantially horizontal links pivoted respectively to the bolster and the frame so as to permit rising and falling movements and transverse movements of the bolster relative to the frame, said links extending on the side of the bolster adjacent said hollow spring block and being in tension so as to hold said hollow spring blocks under pre-compression between the bolster and the frame, regulating means for supplying gas under pressure into the hollow interiors of said spring blocks and for allowing its escape therefrom thereby to regulate the pressure of gas in the spring blocks, and actuating means responsive to changes of load in the vehicle body, said actuating means being operatively connected to actuate said regulating means to regulate the pressure of gas within said spring blocks thereby predeterminedly to limit the vertical deflection of the spring blocks under the load of the bolster and the body of the vehicle regardless of the load in the body of the vehicle.

6. A railway vehicle as claimed in claim 5, wherein each of said links is pivoted to the bolster and to the frame by a part spherical joint including an interlayer of rubber-like material held in compression by the tension in the link, each of the links passing through one of said hollow spring blocks, the rubber interlayers of the pivot joints of the link forming closure seals for the hollow interior of the spring block.

7. In a railway vehicle including a body, a frame and a bolster supporting the vehicle body on the frame, a suspension supporting the bolster from the frame, the suspension comprising a hollow spring block defined by a plurality of rings of rubber-like material having interleaves affixed therebetween, said block being inclined to the vertical so as to be in combined shear and compression under the vertical load of the body and the bolster, the hollow interior of said spring block constituting at least part of an air tight space, the block supporting the bolster at a predetermined reference level under tare load conditions of the vehicle with the pressure of air in the hollow interior of the block at atmospheric pressure, regulating means for supplying air under pressure into said space and for allowing its escape therefrom, thereby to regulate the pressure of air in said space, and actuating means responsive to changes of level of the bolster from said reference level due to changes of loading in the vehicle body, said actuating means being operatively connected to actuate said regulating means to regulate the pressure of air with said space to maintain the bolster at said reference level under loaded conditions of the vehicle body.

References Cited in the file of this patent
UNITED STATES PATENTS

| | | |
|---|---|---|
| 2,674,449 | Tucker | Apr. 6, 1954 |
| 2,737,127 | Williams | Mar. 6, 1956 |
| 2,777,401 | Rossell | Jan. 15, 1957 |
| 2,782,026 | Hirst | Feb. 19, 1957 |
| 2,790,650 | Boschi | Apr. 30, 1957 |
| 2,841,096 | Hirst | July 1, 1958 |
| 2,861,522 | Rossell | Nov. 25, 1958 |
| 2,883,179 | Dean et al. | Apr. 21, 1959 |
| 2,922,635 | DeLorean | Jan. 26, 1960 |